United States Patent
Park et al.

(10) Patent No.: US 9,829,759 B2
(45) Date of Patent: Nov. 28, 2017

(54) LIQUID CRYSTAL DISPLAY DEVICE

(71) Applicant: Samsung Display Co., Ltd., Yongin, Gyeonggi-Do (KR)

(72) Inventors: Seunghyun Park, Seoul (KR); Hyangyul Kim, Hwaseong-si (KR); Junho Song, Seongnam-si (KR); Jeanho Song, Yongin-si (KR)

(73) Assignee: Samsung Display Co., Ltd. (KR)

( * ) Notice: Subject to any disclaimer, the term of this patent is extended or adjusted under 35 U.S.C. 154(b) by 134 days.

(21) Appl. No.: 14/857,398

(22) Filed: Sep. 17, 2015

(65) Prior Publication Data
US 2016/0266456 A1    Sep. 15, 2016

(30) Foreign Application Priority Data

Mar. 10, 2015  (KR) .................. 10-2015-0033322

(51) Int. Cl.
  *G02F 1/1362*  (2006.01)
  *G02F 1/1343*  (2006.01)
  *G02F 1/1335*  (2006.01)

(52) U.S. Cl.
  CPC .. *G02F 1/136213* (2013.01); *G02F 1/134309* (2013.01); *G02F 1/136209* (2013.01); *G02F 1/133512* (2013.01); *G02F 2001/134372* (2013.01)

(58) Field of Classification Search
  CPC ... G02F 1/136213; G02F 2001/134372; G02F 1/133512; G02F 1/136209; G02F 1/1343; G02F 1/134309; G02F 2001/134318; G02F 1/136286
  See application file for complete search history.

(56) References Cited

U.S. PATENT DOCUMENTS

2010/0079712 A1* 4/2010 Tanaka ............ G02F 1/133512
                                                    349/123
2010/0296042 A1* 11/2010 Yonemura ........ G02F 1/134363
                                                    349/143

(Continued)

FOREIGN PATENT DOCUMENTS

KR    1019960026976 A    7/1996
KR    1020020056698 A    7/2002

(Continued)

*Primary Examiner* — Jia Pan
(74) *Attorney, Agent, or Firm* — Innovation Counsel LLP

(57) ABSTRACT

A liquid crystal display (LCD) device includes: a first substrate and a second substrate disposed opposite to each other; a liquid crystal layer disposed between the first substrate and the second substrate; a gate line and a data line disposed on the first substrate; a transistor connected to the gate line and the data line; a pixel electrode disposed in a pixel region of the first substrate; a connecting electrode connecting the pixel electrode and the transistor; a common electrode overlapping the pixel electrode; a protection layer disposed between the pixel electrode and the common electrode; and a black matrix disposed on the protection layer, the black matrix defining the pixel region. The black matrix includes: a horizontal portion extending along the gate line and a vertical portion extending along the data line and overlaps the data line and at least one of the pixel electrode and the common electrode.

18 Claims, 9 Drawing Sheets

(56) References Cited

U.S. PATENT DOCUMENTS

| | | | | |
|---|---|---|---|---|
| 2011/0211145 | A1* | 9/2011 | Tsuruma | G02F 1/133512 349/106 |
| 2012/0075563 | A1* | 3/2012 | Takeda | G02F 1/133377 349/139 |
| 2012/0249940 | A1* | 10/2012 | Choi | G02F 1/133753 349/123 |
| 2012/0268813 | A1* | 10/2012 | Kim | G02F 1/133512 359/450 |
| 2013/0242221 | A1* | 9/2013 | Nishida | G02F 1/1323 349/43 |
| 2014/0160401 | A1* | 6/2014 | Yonemura | G02F 1/133512 349/96 |
| 2015/0205161 | A1* | 7/2015 | Okita | G02F 1/133512 349/106 |

FOREIGN PATENT DOCUMENTS

| | | |
|---|---|---|
| KR | 1020110044108 A | 4/2011 |
| KR | 1020110132724 A | 12/2011 |

* cited by examiner

LIQUID CRYSTAL DISPLAY DEVICE

CROSS-REFERENCE TO RELATED APPLICATION

This application claims priority to and the benefit of Korean Patent Application No. 10-2015-0033322, filed on Mar. 10, 2015, with the Korean Intellectual Property Office, the disclosure of which is incorporated herein in its entirety by reference.

BACKGROUND

1. Field

Embodiments of the present disclosure relate to a liquid crystal display (LCD) device capable of increasing capacitance of a storage capacitor.

2. Description of the Related Art

An LCD device is a type of flat panel displays (FPDs) that are widely used these days. An LCD device includes two substrates including electrodes formed thereon and a liquid crystal layer interposed therebetween. Upon applying voltage to two electrodes, liquid crystal molecules of the liquid crystal layer are rearranged, such that an amount of transmitted light is adjusted.

The LCD device may stably maintain, using a storage capacitor, an image data signal during a period of a frame. Accordingly, it is crucial to secure capacitance of the storage capacitor in order to improve image quality.

It is to be understood that this background section is intended to provide background information for understanding the technology and as such disclosed herein, therefore the background section may include ideas, concepts or recognitions that are not part of what are known or appreciated by those skilled in the pertinent art prior to a corresponding effective filing date of a subject matter disclosed herein.

SUMMARY

Aspects of embodiments of the present disclosure are directed to a liquid crystal display (LCD) device capable of increasing capacitance of a storage capacitor. According to an exemplary embodiment, an LCD device includes: a first substrate and a second substrate disposed opposite to each other; a liquid crystal layer disposed between the first substrate and the second substrate; a gate line and a data line disposed on the first substrate; a transistor connected to the gate line and the data line; a pixel electrode disposed in a pixel region of the first substrate; a connecting electrode connecting the pixel electrode and the transistor; a common electrode overlapping the pixel electrode; a protection layer disposed between the pixel electrode and the common electrode; and a black matrix disposed on the protection layer, the black matrix defining the pixel region. The black matrix includes: a horizontal portion extending along the gate line and a vertical portion extending along the data line and overlaps the data line and at least one of the pixel electrode and the common electrode.

The vertical portion may be disposed along a side substantially parallel to the data line, among sides of the pixel electrode.

The vertical portion may be in contact with one of the pixel electrode and the common electrode.

The vertical portion may be in contact with an upper surface of the pixel electrode.

An area of the pixel electrode overlapping the vertical portion may be less in size than an area of the pixel electrode not overlapping the vertical portion. The area of the pixel electrode overlapping the vertical portion may be less in size than the area of the pixel electrode not overlapping the vertical portion by 50%.

The vertical portion may have a width in a range of about 2 μm to about 13 μm. A height H of the black matrix maybe defined by a formula, $$W \times 0.11 \leq H \leq W \times 1.5,$$

wherein W denotes a width of the vertical portion.

The pixel electrode includes: a stem electrode disposed on the protection layer and connected to the connecting electrode; and a plurality of branch electrodes branching off from the stem electrode and disposed to be spaced apart from each other.

The vertical portion may be disposed on at least one branch electrode of two branch electrodes disposed on an outermost portion.

The vertical portion may be disposed along a side substantially parallel to the data line, among sides of the at least one branch electrode.

The vertical portion may entirely cover the side of the branch electrode parallel to the data line.

The side of the branch electrode parallel to the data line may have a bent shape.

An area of the branch electrode overlapping the vertical portion may be less in size than an area of the branch electrode not overlapping the vertical portion.

The area of the branch electrodes of the pixel electrode overlapping the vertical portion may be less in size than the area of the branch electrodes of the pixel electrode not overlapping the vertical portion by 50%.

The LCD device may further include: another pixel electrode disposed adjacent to the pixel electrode with the data line interposed therebetween. A gap between the branch electrodes of the pixel electrode may be greater than a gap between the branch electrode of the pixel electrode and a branch electrode of the another pixel electrode.

The vertical portion may further overlap another pixel electrode disposed adjacent to the pixel electrode with the data line interposed therebetween.

The common electrode include: a stem electrode disposed on the protection layer; and a plurality of branch electrodes branching off from the stem electrode and disposed to be spaced apart from each other.

One of the pixel electrode and the common electrode may include a linear electrode, and the other one thereof may include a surface electrode.

The horizontal portion may overlap the gate line, the transistor, the connecting electrode, and the data line.

According to the present disclosure, a pixel electrode may extend to the point of a common electrode being covered by a black matrix. Accordingly, an overlapping area between the pixel electrode and the common electrode may increase in size, thereby increasing capacitance of a storage capacitor formed between the pixel electrode and the common electrode.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the disclosure of the subject matter will be more clearly understood from the following detailed description taken in conjunction with the accompanying drawings, in which.

DETAILED DESCRIPTION

Figure 1:
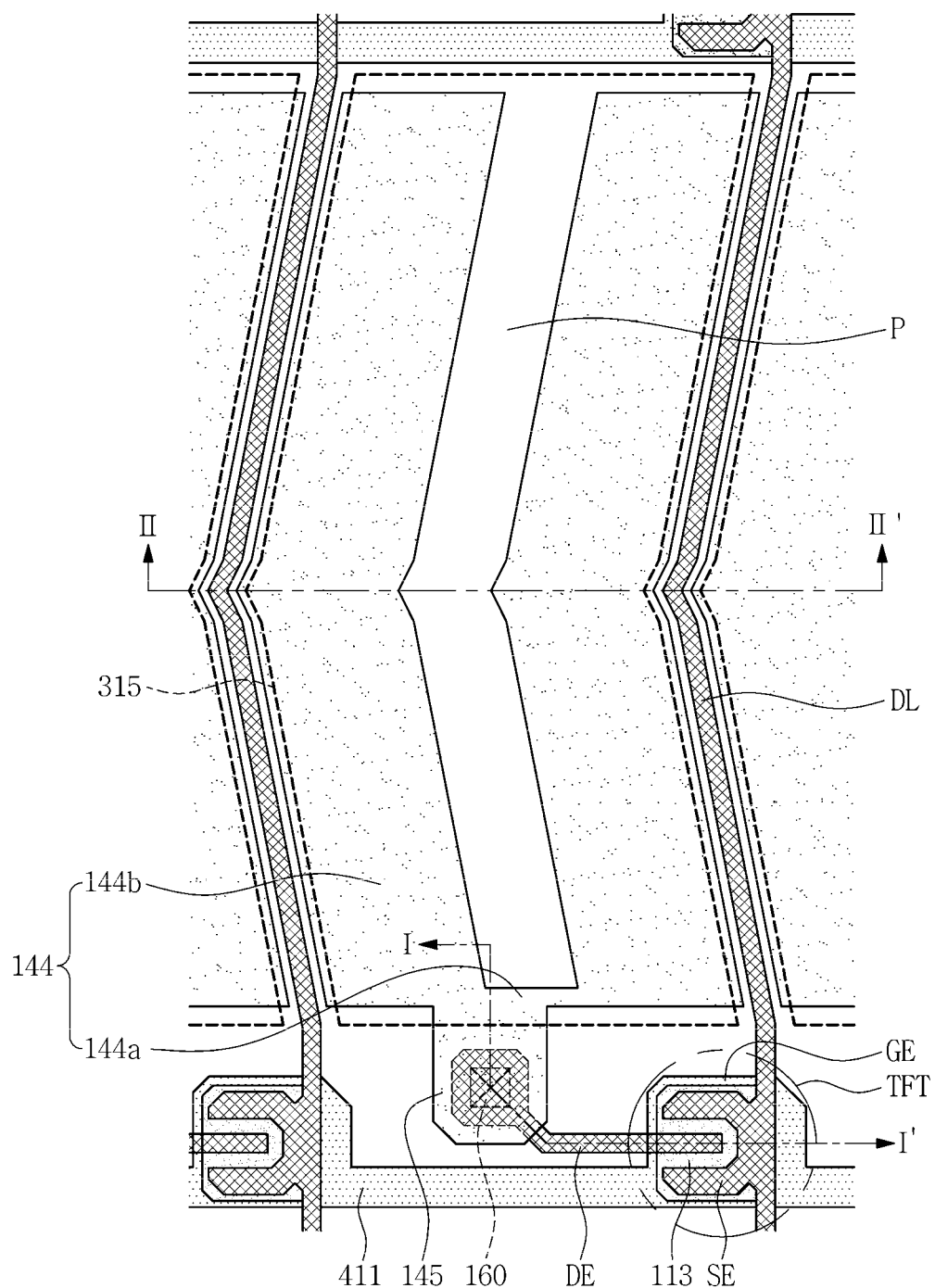
FIG. 1 is a plan view illustrating a pixel according to an exemplary embodiment.

Advantages and features of the present disclosure and methods for achieving them will be made clear from embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the present disclosure to those skilled in the art. The present disclosure is merely defined by the scope of the claims. Therefore, well-known constituent elements, operations and techniques are not described in detail in the embodiments in order to prevent the present disclosure from being obscurely interpreted. Like reference numerals refer to like elements throughout the specification.

In the drawings, thicknesses are illustrated in an enlarged manner in order to clearly describe a plurality of layers and areas. Like reference numbers are used to denote like elements throughout the specification. When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The spatially relative terms "below," "beneath," "lower," "above," "upper," and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element," and "a third element" can be termed likewise without departing from the teachings herein.

Unless otherwise defined, all terms used herein (including technical and scientific terms) have the same meaning as commonly understood by those skilled in the art to which the present disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 2:
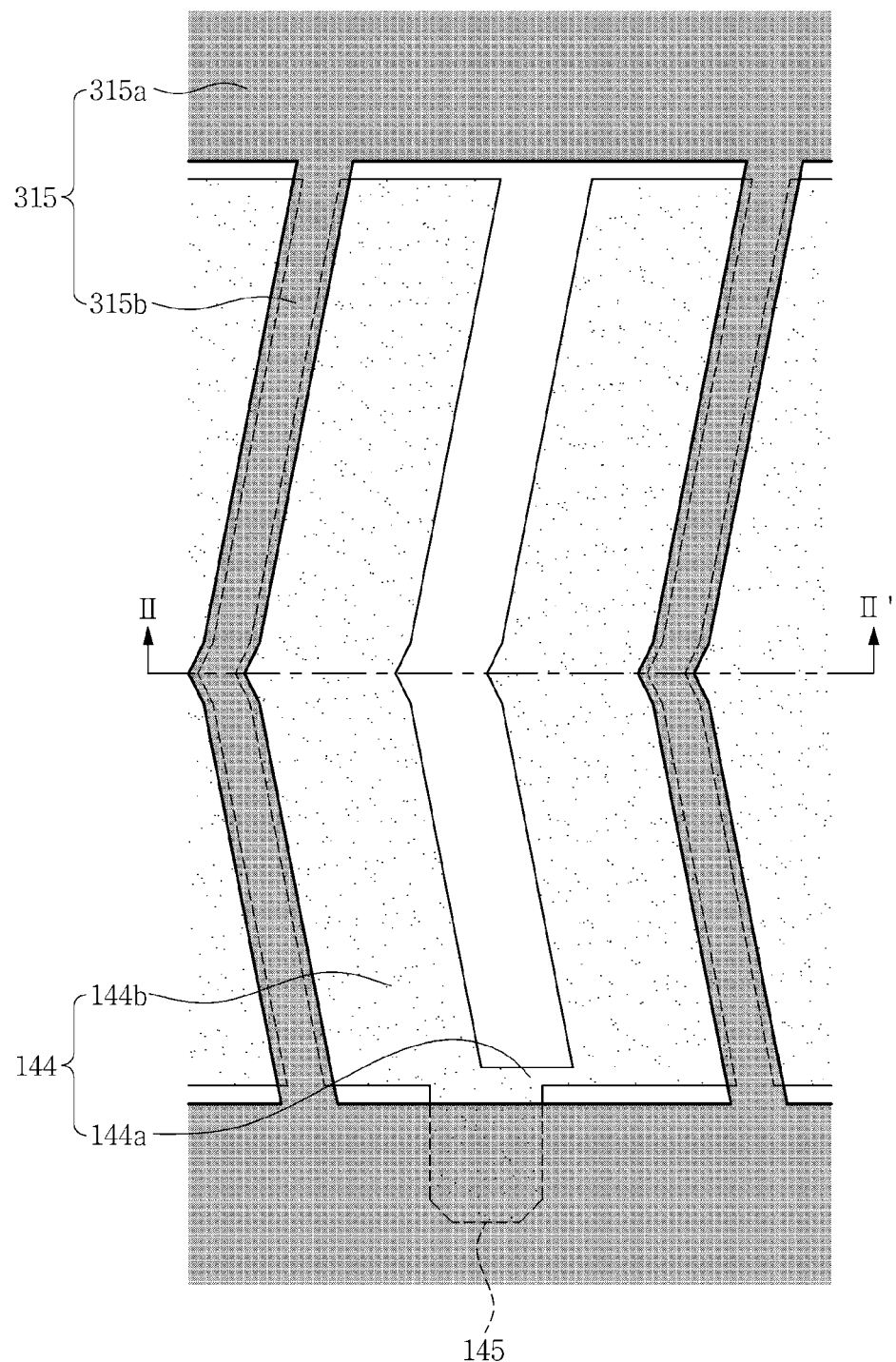
FIG. 2 is a view separately illustrating a black matrix and a pixel electrode of FIG. 1.
Figure 3:
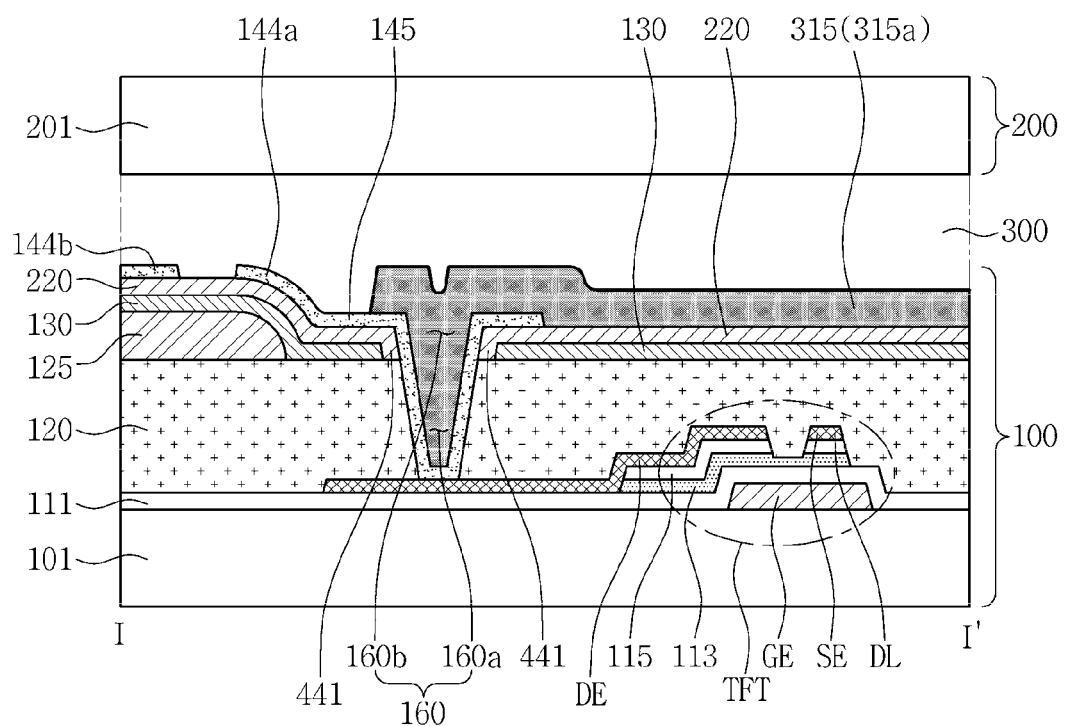
FIG. 3 is a cross-sectional view taken along line I-I' of FIG. 1.

FIG. 1 is a plan view illustrating a pixel according to an exemplary embodiment; FIG. 2 is a view separately illustrating a black matrix and a pixel electrode of FIG. 1; FIG. 3 is a cross-sectional view taken along line I-I' of FIG. 1; and FIG. 4 is a cross-sectional view taken along line II-II' of FIGS. 1 and 2.

Figure 4:
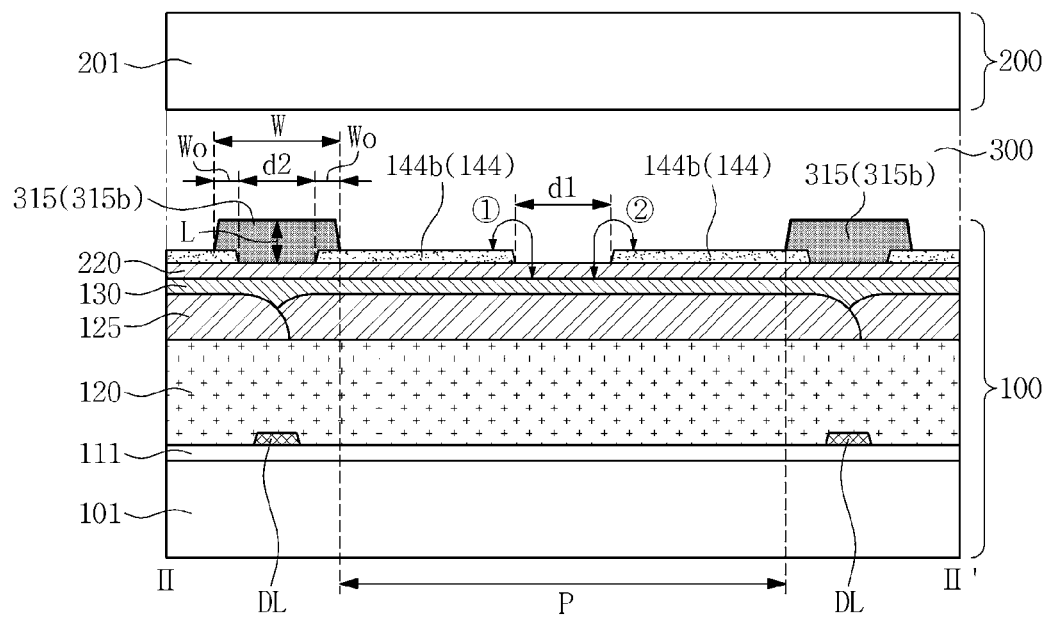
FIG. 4 is a cross-sectional view taken along line II-IP of FIGS. 1 and 2.

Referring to FIGS. 3 and 4, a liquid crystal display (LCD) device according to an exemplary embodiment includes: a lower panel 100 and an upper panel 200 facing each other; and a liquid crystal layer 300 interposed therebetween. The lower panel 100, as illustrated in FIGS. 1 through 4, includes a lower substrate 101, a gate line GL, a gate insulating layer 111, a semiconductor layer 113, an ohmic contact layer 115, a source electrode SE, a drain electrode DE, a thin film transistor (TFT), a data line DL, a first protection layer 120, a color filter 125, a common electrode 130, a second protection layer 220, a pixel electrode 144, and a black matrix 315. The lower substrate 101 may be an insulating substrate including transparent materials, such as glass or plastics.

As illustrated in FIG. 1, the gate line GL is disposed on the lower substrate 101. The gate line GL may include a line unit 411 and an electrode unit GE (hereinafter, "gate electrode"), each having widths different from each other. For example, the gate electrode GE may have a width greater than that of the line unit 411. The line unit 411 and the electrode unit GE may be integrally formed. Although not illustrated, the gate line GL may have a connecting portion (e.g., an end portion) that is larger than other portions thereof in size, to be properly connected to another layer or an external driving circuit.

The gate line GL may include at least one metal of aluminum (Al) or alloys thereof, silver (Ag) or alloys thereof, copper (Cu) or alloys thereof, and/or molybdenum (Mo) or alloys thereof. Further, the gate line GL may include one of chromium (Cr), tantalum (Ta), and titanium (Ti). In some embodiments, the gate line GL may have a multi-layer structure including at least two conductive layers that have different physical properties.

The gate insulating layer 111 is disposed on the gate line GL. In some embodiments, the gate insulating layer 111 may be formed over the entire surface of the lower substrate 101 including the gate line GL. The gate insulating layer 111 may be made of silicon nitrides ($SiN_x$), silicon oxides ($SiO_x$), or the like. The gate insulating layer 111 may have a multi-layer structure including at least two insulating layers that have physical properties different from each other.

The semiconductor layer 113 is disposed on the gate insulating layer 111. In some embodiments, the semiconductor layer 113 may at least partially overlap the gate electrode GE. The semiconductor layer 113 may be made of amorphous silicon, polycrystalline silicon, or the like.

The ohmic contact layer 115 is disposed on the semiconductor layer 113. The ohmic contact layer 115 may include silicide or n+ hydrogenated amorphous silicon doped with n-type impurities, such as phosphorus, at high concentration. The ohmic contact layer 115 may be disposed on the semiconductor layer 113 in pairs.

The source and drain electrodes SE and DE are disposed on the ohmic contact layer 115. The source electrode SE may branch off from the data line DL and as illustrated in FIG. 1, may have a shape protruding toward the gate electrode GE. The source electrode SE may have an inverted C-shape enclosing a part of the drain electrode DE. The source electrode SE may at least partially overlap the semiconductor layer 113 and the gate electrode GE. In some embodiments, the source electrode SE may have one of a C-shape, a U-shape, and an inverted U-shape, in lieu of the inverted C-shape.

In particular, the source electrode SE may be made of refractory metal, such as molybdenum, chromium, tantalum and titanium, or a metal alloy thereof, and may have a multi-layer structure including a refractory metal layer and a low-resistance conductive layer. Examples of the multi-layer structure include, but are not limited to: a double-layer structure including a chromium or molybdenum (alloy) lower film and an aluminum (alloy) upper film; and a triple-layer structure including a molybdenum (alloy) lower film, an aluminum (alloy) intermediate film, and a molybdenum (alloy) upper film. In some embodiments, the source electrode SE may be made of various metals or conductive materials rather than the aforementioned materials.

One side of the drain electrode DE may be connected to the pixel electrode 144 through a connecting electrode 145. One side of the drain electrode DE may overlap the connecting electrode 145, and another side of the drain electrode DE may overlap the semiconductor layer 113 and the gate electrode GE. The drain electrode DE may also include the same material and have the same structure (a multi-layer structure) as in the source electrode SE. In other words, the drain electrode DE and the source electrode SE may be simultaneously formed in the same process.

The gate, source, and drain electrodes GE, SE, and DE may together form a TFT along with the semiconductor layer 113. In some embodiments, a channel of the TFT may be partially formed on the semiconductor layer 113 between the source and drain electrodes SE and DE. A portion of the semiconductor layer 113 corresponding to the channel may have a thickness less than that of other portions of the semiconductor layer 113.

The data line DL is configured to transmit an image data signal. The data line DL is formed on the gate insulating layer 111. Although not illustrated, the data line DL may have a connecting portion (e.g., an end portion) that is larger than other portions thereof in size, to be properly connected to another layer or an external driving circuit.

The data line DL may intersect the gate line GL. The data lines DL may be provided in a zigzag arrangement. In some embodiments, to achieve a greater transmittance of the LCD device, a protrusion having a wedge shape may be disposed on a bent portion of the data line DL. Herein, the data line DL may be divided into a protrusion and line units respectively disposed at both sides of the protrusion, and a contained angle of the protrusion is less than a contained angle of the line units.

The data line DL may be made of the same material and may have the same structure (a multi-layer structure) as in the source electrode SE. In other words, the data line DL and the source electrode SE may be simultaneously formed in the same process.

The first protection layer 120 is disposed on the data line DL, the source electrode SE, and the drain electrode DE. In some embodiments, the first protection layer 120 may be formed over the entire surface of the lower substrate 101 including the data line DL, the source electrode SE, and the drain electrode DE.

The first protection layer 120 may be made of an inorganic insulating material such as silicon nitrides ($SiN_x$) and silicon oxides ($SiO_x$). In one embodiment, the inorganic insulating material has photosensitivity and a dielectric constant of about 4.0. The first protection layer 120 may also have a double-layer structure including a lower inorganic layer and an upper organic layer. The double-layer structure may impart desirable insulating properties and prevent damage to exposed portions of the semiconductor layer 113. In one example, the first protection layer 120 has a thickness of about 5000 Å or more, and in another example, the first protection layer 120 has a thickness of about 6000 Å to about 8000 Å. The first protection layer 120 may have a lower contact hole 160a extending partially therethrough, and the drain electrode DE may be partially exposed through the lower contact hole 160a.

The color filter 125 is disposed on the first protection layer 120. For example, the color filter 125 may be disposed on the first protection layer 120 corresponding to the pixel region P of the lower substrate 101. The color filters 125 may include a red color filter, a green color filter, and a blue color filter. For example, referring to FIG. 4, a color filter disposed at a leftmost portion may be a red color filter, a color filter disposed at a rightmost portion may be a blue color filter, and a color filter disposed at the center may be a green color filter.

The common electrode 130 is disposed on the first protection layer 120 and on the color filter 125. In some embodiments, the common electrode 130 may be formed over the entire surface of the lower substrate 101 including the first protection layer 120 and the color filter 125. However, as illustrated in FIG. 3, the common electrode 130 has an aperture extending partially therethrough, and the aperture is disposed directly on the lower contact hole 160a. The aperture may have a size enough to enclose the lower contact hole 160a and an upper contact hole 160b to be described below. The drain electrode DE may be partially exposed through the aperture and through the lower contact hole 160a.

The common electrode 130 may be made of a transparent conductive material such as indium tin oxide (ITO) and indium zinc oxide (IZO). In some embodiments, ITO and IZO may be a polycrystalline or monocrystalline material. In other embodiments, the common electrode 130 may be made of the same material as the material used to form the gate line GL or the data line DL.

A second protection layer 220 is disposed on the common electrode 130. In some embodiments, the second protection layer 220 may be formed over the entire surface of the lower substrate 101 including the common electrode 130. The second protection layer 220 may be made of a material used to form the first protection layer 120.

The second protection layer 220 may have an upper contact hole 160b extending partially therethrough, and the upper contact hole 160b may be disposed directly on the aforementioned aperture. The lower contact hole 160a and the upper contact hole 160b may be connected to each other through the aperture, thereby forming a single drain contact hole 160.

According to one embodiment, the drain contact hole 160 may be formed in a sequence of processes described below. Subsequent to forming the common electrode 130 on the first protection layer 120, the common electrode 130 is partially removed through a photolithography process and an etching process, thereby forming an aperture. The first protection layer 120 is exposed through the aperture. Subsequently, the second protection layer 220 is formed over the surface of the lower substrate 101 including the common electrode 130 defined with the aperture. In some embodiments, a portion of the second protection layer 220 may be brought into contact with the first protection layer 120 exposed through the aperture. Next, a portion of the second protection layer 220 and a portion of the first protection layer 120 that are disposed within the aperture, are removed together through a photolithography process and an etching process, thereby forming the drain contact hole 160. In some embodiments, the drain contact hole 160 is smaller than the aperture. When the drain contact hole 160 is smaller than the aperture, an exposed surface of the common electrode 130, corresponding to an inner wall of the aperture, may be sufficiently covered by the second protection layer 220 to prevent a short circuit between the common electrode 130 and the pixel electrode 144 that are subsequently inserted to the drain contact hole 160.

The pixel electrode 144 may generate a horizontal electric field along with the common electrode 130. The pixel electrode 144 is disposed on the second protection layer 220. In some embodiments, the pixel electrode 144 may be disposed on the second protection layer 220 corresponding to the pixel region P of the lower substrate 101.

The pixel electrode 144 may include a stem electrode 144a and a plurality of branch electrodes 144b branching off from the stem electrode 144a. The plurality of branch electrodes 144b may be spaced a predetermined distance apart from each other. The stem electrode 144a and the branch electrodes 144b may overlap the common electrode 130.

A horizontal electric field may be generated between the branch electrodes 144b, which are linear electrodes, and the common electrode 130, which is a surface electrode. Each of the branch electrodes 144b may extend in a direction that is substantially parallel to a direction of the data line DL. Each of the branch electrodes 144b may have a shape that is substantially similar to a shape of a part of the data line DL.

Further, each of the branch electrodes 144b may have a protrusion having a wedge shape. The protrusion of each of the branch electrodes 144b may have a shape that is substantially the same as that of the protrusion of the data line DL. The branch electrodes 144b may further extend outwardly of the pixel region P.

The pixel electrode 144 may be made of a transparent conductive material such as ITO and IZO. In some embodiments, ITO and IZO may be a polycrystalline or monocrystalline material.

The connecting electrode 145 may be connected between the pixel electrode 144 and the TFT. The connecting electrode 145 may be integrally formed along with the pixel electrode 144. The connecting electrode 145 may extend from the stem electrode 144a of the pixel electrode 144 to be disposed on the drain electrode DE of the TFT. The connecting electrode 145 may be connected to the drain electrode DE through the drain contact hole 160. The connecting electrode 145 may be made of a material that is used to form the pixel electrode 144. The connecting electrode 145 and the pixel electrode 144 may be integrally formed.

As illustrated in FIG. 3, a part 441 of the second protection layer 220 is disposed between the pixel electrode 144 and an exposed surface of the common electrode 130 forming an inner wall of the aperture, thereby preventing a short circuit caused between the pixel electrode 144 and the common electrode 130.

The black matrix 315 is disposed on the second protection layer 220 and a portion of the connecting electrode 145. The black matrix 315 may prevent light from being directed outwards through an area aside from the pixel region P. In other words, the black matrix 315 may prevent light leakage at a non-pixel region. To this end, the black matrix 315 may have an aperture defined corresponding to the pixel region P, and may cover an entire area apart from the pixel region P. Accordingly, the pixel region P may be defined by the black matrix 315.

The black matrix 315 may have a permittivity in a range of about 3 to about 5. The black matrix 315 will be described in detail with reference to FIG. 2. According to one embodiment, the black matrix 315 includes a horizontal portion 315a and a vertical portion 315b.

The horizontal portion 315a of the black matrix 315 may extend along the gate line GL. The horizontal portion 315a may overlap the gate line GL, the TFT, the connecting electrode 145, and the data line DL. In some embodiments, the gate electrode GE, the source electrode SE, and the drain electrode DE of the TFT may overlap the horizontal portion 315a together.

The vertical portion 315b of the black matrix 315 may prevent electric fields that may be generated between adjacent pixel regions, from affecting one another. That is, to prevent an electric field from being generated between a pixel electrode 144 of a predetermined pixel region P and a pixel electrode of another pixel region, the vertical portion 315b may be disposed between the pixel regions. To this end, the vertical portion 315b may be disposed between the horizontal portions 315a adjacent to each other, and may extend along the data line DL.

The vertical portion 315b of the black matrix 315 may overlap the data line DL and a portion of the pixel electrode 144. In some embodiments, the vertical portion 315b may overlap two pixel electrodes disposed adjacent to each other with the data line DL interposed therebetween. For example, the vertical portion 315b, as illustrated in FIGS. 2 and 4, may overlap the pixel electrode 144 disposed in the pixel region P and another pixel electrode disposed in another pixel region.

As the vertical portion 315b of the black matrix 315 and the pixel electrode 144 overlap each other, an overlapping area between the pixel electrode 144 and the common electrode 130 may increase in size by the overlapping area between the vertical portion 315b and the pixel electrode 144. That is, as the pixel electrode 144 extends to the point of the common electrode 130 being covered by the black matrix 315, an overlapping area between the pixel electrode 144 and the common electrode 130 may increase in size. Accordingly, capacitance of a storage capacitor formed between the pixel electrode 144 and the common electrode 130 may increase.

When the pixel electrode 144 includes a plurality of branch electrodes 144b, the vertical portion 315b may overlap at least one of two branch electrodes 144b disposed at an outermost portion. Referring to FIGS. 3 and 4, when a single pixel electrode 144 includes two branch electrodes 144b, the two branch electrodes 144b may be disposed at the outermost portion, and thus the vertical portion 315b may overlap both of the two branch electrodes 144b.

Although not illustrated, when the pixel electrode 144 includes three branch electrodes, and two branch electrodes, except for a branch electrode disposed at the center, are defined as outermost branch electrodes. At least one of the two outermost electrodes may overlap the vertical portion 315b.

Referring to FIGS. 2 and 4, when the vertical portion 315b of the black matrix 315 overlaps two branch electrodes 144b, two kinds of electric fields may be generated in a single pixel region P. In particular, as illustrated in FIG. 4, when among the branch electrodes disposed in the single pixel region P, a branch electrode disposed in a left portion is defined as a first branch electrode, and a branch electrode disposed in a right portion is defined as a second branch electrode. In this case, the electric field may include a first electric field ① that is generated between the first branch electrode and the common electrode 130 and a second electric field ② that is generated between the second branch electrode and the common electrode 130.

The vertical portion 315b of the black matrix 315 may be in contact with the pixel electrode 144. For example, the vertical portion 315b may be in contact with an upper surface of the pixel electrode 144. Herein, the upper surface of the pixel electrode 144 refers to an upper surface of the branch electrode 144b. The upper surface of the branch electrode 144b may face the liquid crystal layer 300. Referring to FIG. 3, the vertical portion 315b is in contact with an edge portion of the upper surface of the branch electrode 144b. The vertical portion 315b of the black matrix 315 may be further in contact with a lateral surface of the branch electrode 144b.

The vertical portion 315b of the black matrix 315 may be positioned along a side substantially parallel to the data line DL, among sides of the pixel electrode 144. For example, as illustrated in FIG. 4, a branch electrode 144b of the pixel electrode 144 may have a plurality of sides, and the vertical portion 315b may be disposed along one of the plurality of sides that is substantially parallel to the data line DL and adjacent to the data line DL. Herein, the one of the plurality of sides may have a bent shape. In some embodiments, the vertical portion 315b, as illustrated in FIG. 2, may entirely cover the one of the plurality of sides.

An area of the pixel electrode 144 overlapping the vertical portion 315b of the black matrix 315 may be less in size than an area of the pixel electrode 144 not overlapping the vertical portion 315b. In other words, an area of the branch electrode 144b overlapping the vertical portion 315 may be less in size than an area of the branch electrode 144b not overlapping the vertical portion 315b.

By way of example, the area of the pixel electrode 144 overlapping the vertical portion 315b of the black matrix 315 may be less in size than the area of the pixel electrode 144 not overlapping the vertical portion 315b by about 50%. In other words, the area of the branch electrodes 144b of the pixel electrode 144 overlapping the vertical portion 315b may be less in size than the area of the branch electrodes 144b of the pixel electrode 144 not overlapping the vertical portion 315b by about 50%.

The vertical portion 315b of the black matrix 315, as illustrated in FIG. 4, may have a width W in a range of about 2 μm to about 13 μm. In some embodiments, an overlapping width Wo of an overlapping area between the vertical portion 315b of the black matrix 315 and the pixel electrode 144 may vary based on the size of the pixel electrode 144.

The height of the vertical portion 315b, as illustrated in FIG. 4, may be defined as a distance between a lower surface of the black matrix 315 that is in contact with the second protection layer 220, and an upper surface of the black matrix 315 disposed opposite to the lower surface. The vertical portion 315b of the black matrix 315 may have a height obtained by the following formula.

$$W*0.11 \leq H \leq W*1.5,$$

wherein W refers to a width of the vertical portion 315b, and as described above, may be in a range of about 2 μm to about 13 μm.

As illustrated in FIG. 4, a distance d1 between the branch electrodes 144b disposed adjacent to each other within a single pixel electrode 144 may be greater than a gap d2 between the branch electrode 144b of the pixel electrode 144 and a branch electrode of an another pixel electrode. Herein, the pixel electrode 144 and the another pixel electrode may be disposed adjacent to each other with the data line DL interposed therebetween.

Although not illustrated, a lower alignment layer may be disposed on the pixel electrode 144, the connecting electrode 145, the second protection layer 220, and the black matrix 315. The lower alignment layer may be a homeotropic alignment layer and may include a photoreactive material. The lower alignment layer may include at least one of polyamic acid, polysiloxane, and polyimide.

The upper panel 200 may include an upper substrate 201. The upper substrate 201 may be an insulating substrate made of a transparent material, such as glass or plastic. Although not illustrated, the upper panel 200 may further include an upper alignment layer. The upper alignment layer may be disposed on the upper substrate. The upper alignment layer may be made of the same material as that of the lower alignment layer.

In some embodiments, surfaces of the lower substrate 101 and the upper substrate 102 that face each other are respectively defined as upper surfaces of the corresponding substrate, and surfaces opposite to the upper surfaces are respectively defined as lower surfaces of the corresponding substrate. An upper polarizer may further be disposed on the lower surface of the lower substrate 101, and a lower polarizer may further be disposed on the lower surface of the upper substrate 201.

A transmission axis of the upper polarizer may be perpendicular to a transmission axis of the lower polarizer, and thus one of the transmission axes thereof and the line unit 411 of the gate line GL may be disposed in parallel with respect to each other. The display device may include only one of the upper polarizer and the lower polarizer.

In one embodiment, the color filter 125 may be disposed on the upper panel 200, but may be absent on the lower panel 100. In some embodiments, the color filter 125 may be disposed in the pixel region of the upper substrate 201.

Figure 5:
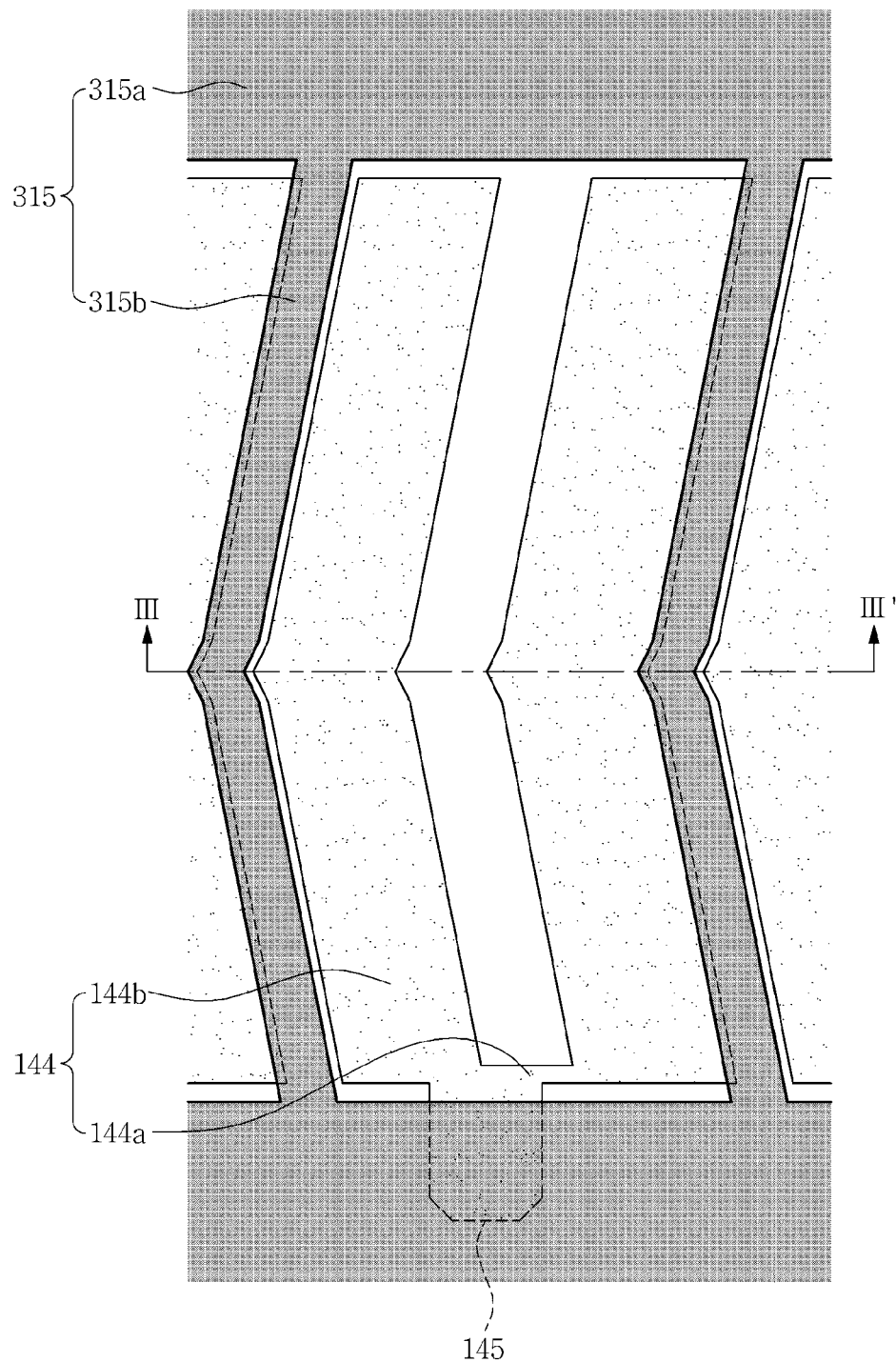
FIG. 5 is a view illustrating a black matrix of FIG. 1 according to another exemplary embodiment.
Figure 6:
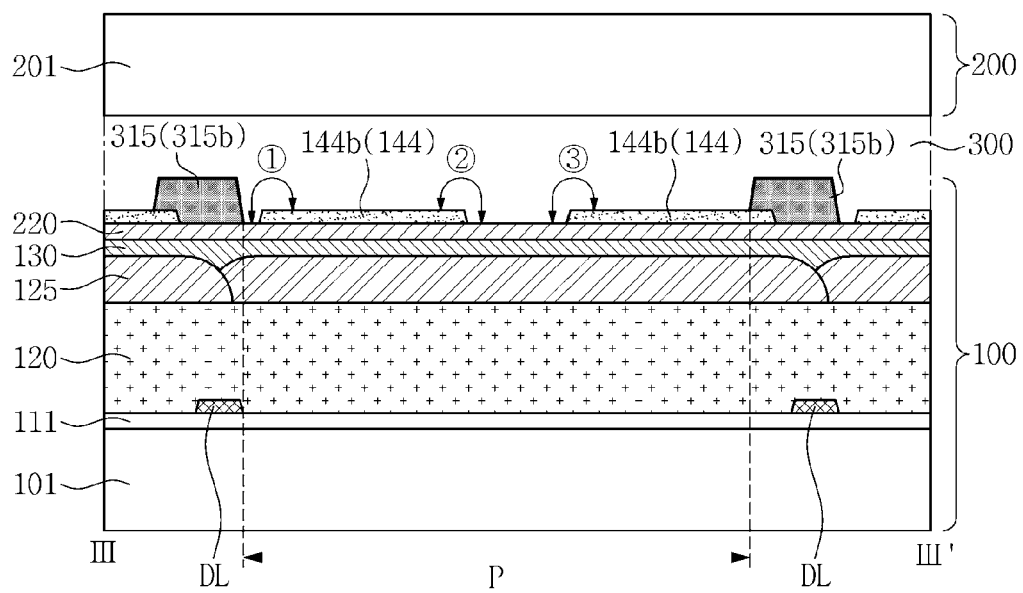
FIG. 6 is a cross-sectional view taken along line III-III' of FIG. 5.

FIG. 5 is a view illustrating a black matrix of FIG. 1 according to another exemplary embodiment. FIG. 6 is a cross-sectional view taken along line III-III' of FIG. 5.

As illustrated in FIGS. 5 and 6, a vertical portion 315b of a black matrix 315 may overlap only one of a plurality of branch electrodes 144b. For example, when two branch electrodes are positioned in a single pixel region P, a branch electrode disposed in the left is defined as a first branch electrode and a branch electrode disposed in the right is defined as a second branch electrode. In some embodiments, only the second branch electrode may overlap the vertical portion 315b, and the first branch electrode may not overlap the vertical portion 315b. In such a case, three kinds of electric fields may be generated. That is, the aforementioned electric fields may include a first electric field ①, a second electric field ② that is generated between both end portions of the first branch electrode and the common electrode 130, and a third electric field ③ that is generated between the second branch electrode and the common electrode 130.

The liquid crystal layer 300 may include a nematic liquid crystal material having a positive dielectric anisotropy. Within the liquid crystal layer 300, the liquid crystal molecules may be aligned to have a structure having a major axis that lies parallel to one of the upper panel 200 and the lower panel 100, and the direction of the major axis is spirally twisted 90 degrees from a rubbing direction of the alignment layer in the lower panel 100 to the upper panel 200. In addition, the liquid crystal layer 300 may include a homeotropic liquid crystal material, in lieu of the nematic liquid crystal material.

Figure 7:
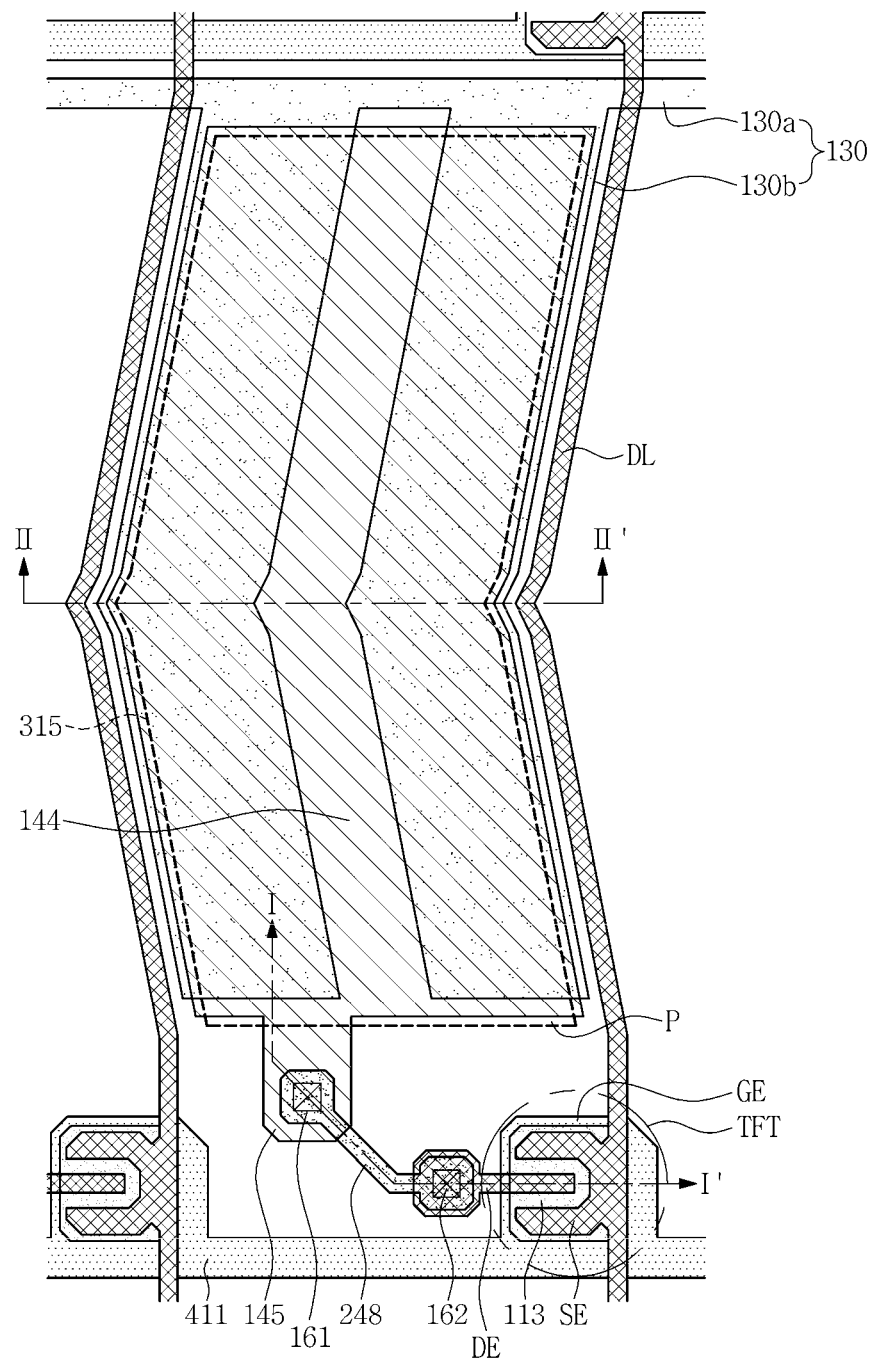
FIG. 7 is a plan view illustrating a pixel according to another exemplary embodiment.
Figure 8:
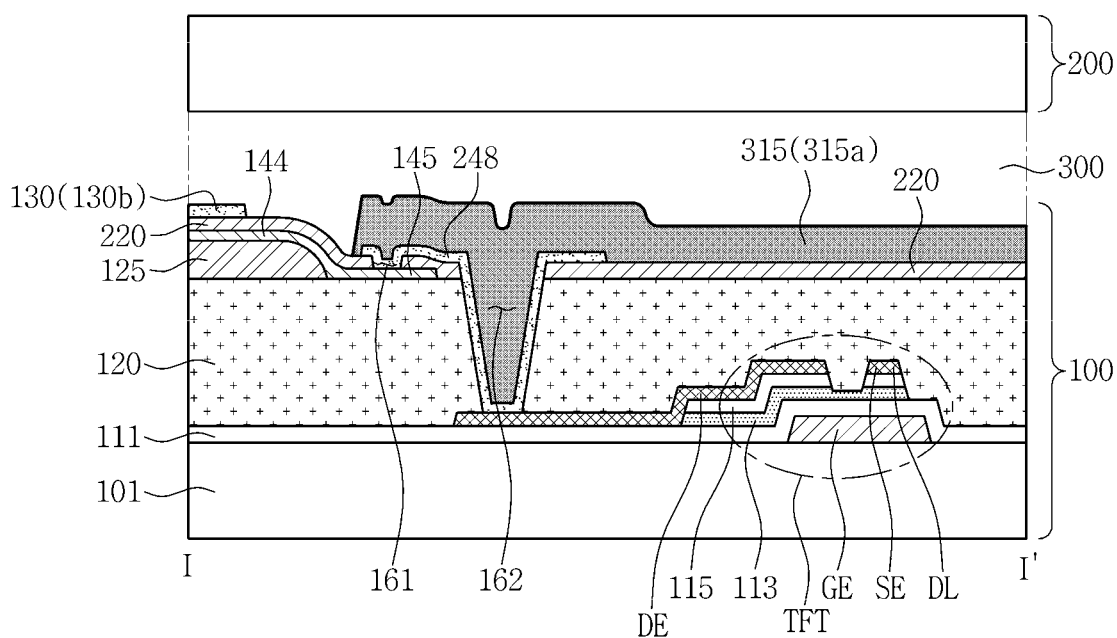
FIG. 8 is a cross-sectional view taken along line I-I' of FIG. 7.

FIG. 7 is a plan view illustrating a pixel according to another exemplary embodiment; FIG. 8 is a cross-sectional view taken along line I-I' of FIG. 7; and FIG. 9 is a cross-sectional view taken along line II-II' of FIG. 7.

Figure 9:
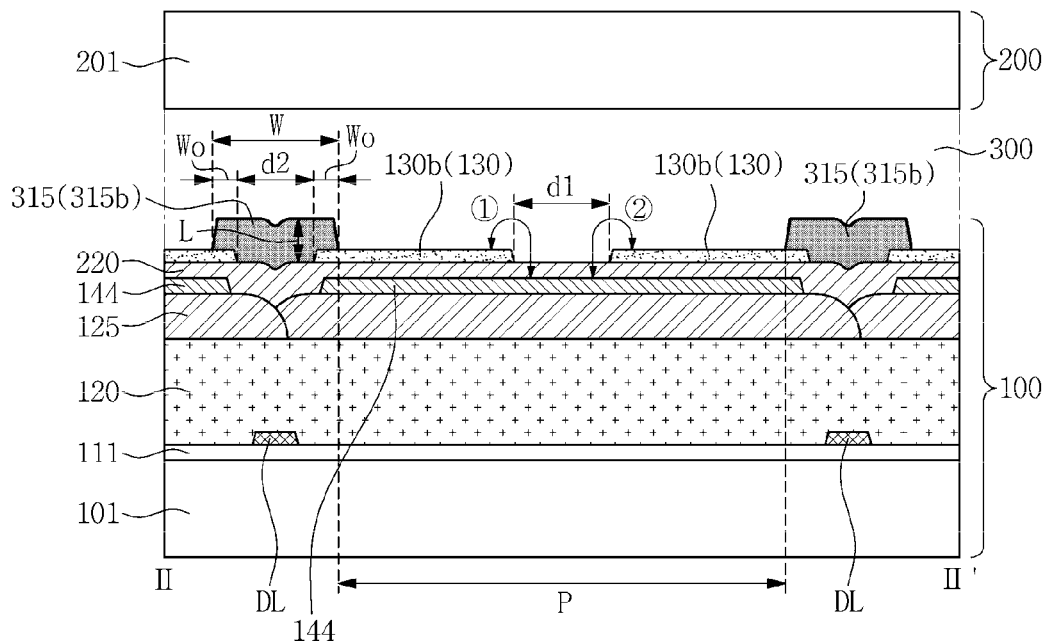
FIG. 9 is a cross-sectional view taken along line II-IP of FIG. 7.

Referring to FIGS. 8 and 9, a liquid crystal display (LCD) device according to another exemplary embodiment includes: a lower panel 100 and an upper panel 200 facing each other; and a liquid crystal layer 300 interposed therebetween. The lower panel 100, as illustrated in FIG. 7 through 9, includes a lower substrate 101, a gate line GL, a gate insulating layer 111, a semiconductor layer 113, an ohmic contact layer 115, a source electrode SE, a drain electrode DE, a TFT, a data line DL, a first protection layer 120, a color filter 125, a common electrode 130, a second protection layer 220, a pixel electrode 144, a bridge electrode 248, and a black matrix 315. The lower substrate 101, the gate line GL, the gate insulating layer 111, the semiconductor layer 113, the ohmic contact layer 115, the source electrode SE, the TFT, the data line DL, the first protection layer 120, the color filter 125, the second protection layer 220, and the black matrix 315 illustrated in FIGS. 7 through 9 are identical to those illustrated in FIGS. 1 through 6, therefore related descriptions will make reference thereto.

The pixel electrode 144 illustrated in FIGS. 7 through 9 is disposed on the first protection layer 120 and on the color filter 125. For example, the pixel electrode 144 may be disposed on the first protection layer 120 and the color filter 125 corresponding to the pixel region P of the lower substrate 101.

The pixel electrode 144 may be made of a transparent conductive material such as ITO and IZO. In some embodiments, ITO and IZO may be a polycrystalline or monocrystalline material. The pixel electrode 144 may be made of the same material used to form the gate line GL or the data line DL.

The common electrode 130 illustrated in FIGS. 7 through 9 may generate a horizontal electric field along with the pixel electrode 144. The common electrode 130 may be disposed on the second protection layer 220. The common electrode 130 may include a stem electrode 130a and a plurality of branch electrodes 130b branching off from the stem electrode 130a. The plurality of branch electrodes 130b may be spaced a predetermined distance apart from each other. At least one of the branch electrodes 130b may overlap the pixel electrode 144. In some embodiments, the stem electrode 130a may overlap the pixel electrode 144.

A horizontal electric field may be generated between the branch electrodes 130b that are linear electrodes, and the pixel electrode 144 that is a surface electrode. The branch electrodes 130b may each extend in a direction that is substantially parallel to a direction of the data line DL. Each of the branch electrode 130b may have a shape that is substantially same as a shape of a part of the data line DL.

Further, the branch electrodes 130b may each have a protrusion having a wedge shape. Each of the protrusions of the branch electrodes 130b may have a shape that is substantially same as a shape of the protrusion of the data line DL.

The common electrode 130 may be made of a transparent conductive material such as ITO and IZO. In some embodiments, ITO and IZO may be a polycrystalline or monocrystalline material.

The bridge electrode 248 may be connected between the connecting electrode 145 and the TFT. One side of the bridge electrode 248 may overlap the connecting electrode 145, and another side of the bridge electrode 248 may overlap the drain electrode DE. The bridge electrode 248 may be connected to the connecting electrode 145 through a first contact hole 161, and may be connected to the drain electrode DE through the first contact hole 161. The bridge electrode 248 may be made of the same material that is used to form the pixel electrode 148.

The vertical portion 315b of the black matrix 315 may overlap the data line DL and the pixel electrode 144. In some embodiments, the vertical portion 315b may overlap two common electrodes disposed adjacent to each other with the data line DL interposed therebetween. For example, the vertical portion 315b, as illustrated in FIG. 9, may overlap the common electrode 130 disposed in the pixel region P and another common electrode disposed in an another pixel region P.

As the vertical portion 315b of the black matrix 315 and the common electrode 130 overlap each other, an overlapping area between the pixel electrode 144 and the common electrode 130 may increase by the overlapping area between the vertical portion 315b and the common electrode 130. In other words, as the common electrode 130 extends to the point of the pixel electrode 144 being covered by the black matrix 315, an overlapping area between the pixel electrode 144 and the common electrode 130 may increase. Accordingly, the capacitance of a storage capacitor formed between the pixel electrode 144 and the common electrode 130 may increase.

From the foregoing, it will be appreciated that various embodiments in accordance with the present disclosure have been described herein for purposes of illustration, and that various modifications may be made without departing from the scope and spirit of the present disclosure. Accordingly, the various embodiments disclosed herein are not intended to be limiting of the true scope and spirit of the present disclosure. Various features of the above described and other embodiments can be mixed and matched in any manner, to produce further embodiments consistent with the present disclosure.

What is claimed is:

1. A liquid crystal display (LCD) device comprising: a first substrate and a second substrate disposed opposite to each other; a liquid crystal layer disposed between the first substrate and the second substrate;
   a gate line and a data line disposed on the first substrate;
   a transistor connected to the gate line and the data line;
   a pixel electrode disposed in a pixel region of the first substrate, the pixel electrode being disposed between the first substrate and the liquid crystal layer;
   a connecting electrode connecting the pixel electrode and the transistor;
   a common electrode overlapping the pixel electrode, the common electrode being disposed between the first substrate and the liquid crystal layer;
   a protection layer disposed between the pixel electrode and the common electrode, the protection layer contacting the pixel electrode and the common electrode; and
   a black matrix disposed on the first substrate between the protection layer and the liquid crystal layer, the black matrix defining the pixel region,
   wherein the black matrix comprises a horizontal portion extending along the gate line and a vertical portion extending along the data line and overlaps the data line and the pixel electrode,
   wherein the black matrix directly contacts a portion of the connecting electrode and the protection layer,
   wherein the black matrix further includes another vertical portion adjacent to the vertical portion,
   wherein a portion of the pixel electrode is disposed between the vertical portion and the another vertical portion; and
   wherein an edge of the portion of the pixel electrode faces the another vertical portion with a gap between the edge and the another vertical portion.

2. The LCD device of claim 1, wherein the vertical portion is disposed along a side substantially parallel to the data line, and along sides of the pixel electrode.

3. The LCD device of claim 1, wherein the vertical portion is in contact with one of the pixel electrode and the common electrode.

4. The LCD device of claim 3, wherein the vertical portion is in contact with an upper surface of the pixel electrode.

5. The LCD device of claim 1, wherein an area of the pixel electrode overlapping the vertical portion is less in size than an area of the pixel electrode not overlapping the vertical portion.

6. The LCD device of claim 1, wherein the vertical portion has a width in a range of about 2 μm to about 13 μm.

7. The LCD device of claim 1, wherein a height H of the black matrix is defined by a formula $$W \times 0.11 \leq H \leq W \times 1.5,$$

wherein W denotes a width of the vertical portion.

8. The LCD device of claim 1, wherein the pixel electrode comprises:
   a stem electrode disposed on the protection layer and connected to the connecting electrode; and
   a plurality of branch electrodes branching off from the stem electrode and disposed to be spaced apart from each other.

9. The LCD device of claim 8, wherein the vertical portion is disposed on one branch electrode of two branch electrodes disposed on an outermost portion.

10. The LCD device of claim 9, wherein the vertical portion is disposed along a side substantially parallel to the data line, and along sides of the at least one branch electrode.

11. The LCD device of claim 10, wherein the vertical portion entirely covers the side of the branch electrode parallel to the data line.

12. The LCD device of claim 10, wherein the side of the branch electrode parallel to the data line has a bent shape.

13. The LCD device of claim 10, wherein an area of the branch electrode overlapping the vertical portion is less in size than an area of the branch electrode not overlapping the vertical portion.

14. The LCD device of claim 8, further comprising another pixel electrode disposed adjacent to the pixel electrode with the data line interposed therebetween,
   wherein a gap between the branch electrodes of the pixel electrode is greater than a gap between the branch electrode of the pixel electrode and a branch electrode of the another pixel electrode.

15. The LCD device of claim 1, wherein the vertical portion further overlaps another pixel electrode disposed adjacent to the pixel electrode with the data line interposed therebetween.

16. The LCD device of claim 1, wherein the common electrode comprises:
   a stem electrode disposed on the protection layer; and
   a plurality of branch electrodes branching off from the stem electrode and disposed to be spaced apart from each other.

17. The LCD device of claim 1, wherein one of the pixel electrode and the common electrode includes a linear electrode, and the other one thereof includes a surface electrode.

18. The LCD device of claim 1, wherein the horizontal portion overlaps the gate line, the transistor, the connecting electrode, and the data line.

* * * * *